(12) United States Patent
Nesbitt

(10) Patent No.: US 9,815,508 B1
(45) Date of Patent: Nov. 14, 2017

(54) PORTABLE DUMPSTER MOVING DEVICE

(71) Applicant: Bryan W. Nesbitt, Burnsville, MN (US)

(72) Inventor: Bryan W. Nesbitt, Burnsville, MN (US)

( * ) Notice: Subject to any disclaimer, the term of this patent is extended or adjusted under 35 U.S.C. 154(b) by 0 days.

(21) Appl. No.: 15/015,883

(22) Filed: Feb. 4, 2016

Related U.S. Application Data

(60) Provisional application No. 62/115,323, filed on Feb. 12, 2015.

(51) Int. Cl.
*B62D 1/06* (2006.01)
*B62D 51/06* (2006.01)
*B60S 9/215* (2006.01)

(52) U.S. Cl.
CPC .............. *B62D 51/06* (2013.01); *B60S 9/215* (2013.01)

(58) Field of Classification Search
CPC ........ B62D 51/06; B62D 51/065; B60S 9/215
USPC ..................................... 180/19.1, 19.2, 19.3
See application file for complete search history.

(56) References Cited

U.S. PATENT DOCUMENTS

| | | | |
|---|---|---|---|
| 3,187,830 A | 6/1965 | Hilton | |
| 3,216,599 A * | 11/1965 | Hopfeld | B60K 1/00 187/223 |
| 3,756,350 A * | 9/1973 | Gandolfo | B66F 9/07518 180/14.1 |
| 4,210,217 A | 7/1980 | Lachowicz | |
| 4,530,411 A | 7/1985 | Grinwald | |
| 5,343,969 A * | 9/1994 | Taylor | B60P 3/1083 180/11 |
| 7,451,841 B2 | 11/2008 | Nelson | |
| 7,845,670 B2 | 12/2010 | Oberg | |
| 2005/0023050 A1 | 2/2005 | Chidlow et al. | |

* cited by examiner

*Primary Examiner* — Tony Winner
*Assistant Examiner* — Felicia L Brittman
(74) *Attorney, Agent, or Firm* — Robert C. Montgomery; Montgomery Patent & Design, LP.

(57) ABSTRACT

The dumpster moving apparatus is a device capable of providing motorized assistance for moving large containers such as refuse dumpsters. The apparatus includes an enclosure containing a motor and having a pair of wheel assemblies. The electric motor is operatively coupled to the wheel assemblies to provide the motorized assistance for moving the container. The motor includes a transmission to provide for both forward and rearward variable-speed motion. A rechargeable battery pack and a control module supply electrical power and a control means to the motor. A tongue and hitch ball extend from a front portion of the enclosure to engage the container during a moving operation. In one (1) embodiment, the apparatus can include associated bracketry for removable connection of the device to a trash collection vehicle when not in use.

18 Claims, 6 Drawing Sheets

PORTABLE DUMPSTER MOVING DEVICE

RELATED APPLICATIONS

The present invention was first described in and claims the benefit of U.S. Provisional Application No. 62/115,323 filed Feb. 12, 2015, the entire disclosures of which are incorporated herein by reference.

FIELD OF THE INVENTION

The present invention relates generally to a device capable of providing motorized assistance for moving large containers.

BACKGROUND OF THE INVENTION

A great deal of the trash and garbage generated in the world today is placed into dumpsters located at central locations near buildings, apartments, townhomes, campgrounds, restaurants, and the like. Typically, a front-loading style garbage truck will then locate and lift these containers, dumping their contents into a rear mounted hopper on the truck.

Unfortunately, many times such dumpsters or containers are blocked in by other vehicles or obstructions and consequently inaccessible to the truck. This forces the worker to get out, and physically manhandle the dumpster into an accessible position in front of the garbage truck. As one can imagine, it is not only very strenuous work, but it also subjects the worker to increased danger from muscle stress and strain.

Accordingly, there exists a need for a means by which dumpsters and other similar containers can be moved about without the use of a truck, or the physical exertion and inherent difficulties described above. The use of the dumpster moving apparatus allows for the movement of dumpsters and similar containers in a manner which is not only quick and effective, but also easy, and safe.

SUMMARY OF THE INVENTION

The inventor has recognized the aforementioned inherent problems and lack in the art and observed that there is a need for a device capable of providing motorized assistance for moving large containers.

It is therefore the purpose of the inventor to provide a moving apparatus, comprising a motor enclosure. The motor enclosure has an interior space within which is secured a power source, a control module in electrical communication with the power source, a motor in electrical communication with the power source and the control module, and a pair of wheel assemblies secured on opposite outer sides of the enclosure by an axle passing through the enclosure. The axle is driven by the motor.

The apparatus also comprises a tongue assembly mounted to a front side of the motor enclosure and projecting perpendicularly to the axle as well as a handle assembly secured to a top surface of the motor enclosure, comprising a control panel in electrical communication with the control module. The tongue assembly is configured to be in mechanical communication with the receiver portion of the dumpster. The tongue assembly may also be removably mounted in some embodiments. The apparatus as a whole is capable of being manipulated by a user via an interface with the control panel which enables selective control of the motor.

The interior space of the motor enclosure further comprises a first pulley mounted to the motor, a drive belt driven by the first pulley and a second pulley located on the axle of and driven by the drive belt. Torsion, which is generated by the motor, is then mechanically communicated to the first pulley, the drive belt, the second pulley, and the axle which turns the pair of wheel assemblies.

The tongue assembly further comprises a bar and a hitch ball. The hitch ball may also comprise an interior electromagnet which projects through an aperture in the top surface distal end of the bar. The electromagnet is in electrical communication with the control module and is selectively magnetized upon activation of the apparatus by the control panel.

The handle assembly further comprises a lower post, an upper post which is pivotally connected to the lower post, a first grip which extends away from the first side of the control panel, a second grip which extends away from the second side of the control panel and the control panel which is affixed to the upper end of the upper post. The control panel may also comprise: firstly, a rheostatic switch which is operably connected to the first and second grip and which is in electrical communication between the control module, the power source and the motor; secondly, an emergency stop button which is in electrical communication between the control module, the power source and the motor; thirdly, a power switch which is in electrical communication between the control module, the power source and the motor; and lastly, a two-position magnet switch which provides selective activation of the electromagnet and is in electrical communication between the power source and the motor. The rotation of each the grip in a forward direction corresponds to a forward direction of rotation of the pair of wheel assemblies while the inverse is also true; namely, the rotation of each the grip in a reverse direction corresponds to a reverse direction of rotation of the pair of wheel assemblies.

The power source may be a rechargeable battery secured within a battery compartment within the motor enclosure. The battery compartment also has a lid located within the top surface of the motor enclosure which itself has a latching mechanism. A battery charging connector is located within the top surface of the motor enclosure and is in electrical communication with the battery when the battery charging connector is in electrical communication with an external power source.

The handle assembly may also comprise a first bracket located on the lower post and a second bracket located on the lower post secured beneath the first bracket. The first and the second bracket are each capable of attachment to a towing vehicle. The motor enclosure may also comprise of an upper pivot plate which has an upper aperture and is secured to the front side of the motor enclosure while projecting perpendicularly to the axle, a lower pivot plate which has a lower aperture secured to the front side of the motor enclosure, beneath the upper pivot plate while projecting perpendicularly to the axle and a pivot pin. The bar of the tongue assembly also may have a pivot pin aperture at a distal end and be secured between the upper and lower pivot plates by the pivot pin being fixedly placed through the aligned upper, bar and lower pin apertures with a snap ring.

The first bracket may be positionally capable of removably interlocking with a third bracket adapted to be affixed to the towing vehicle. The second bracket is positionally capable of removably interlocking with a fourth bracket adapted to be affixed to the towing vehicle. Each wheel assembly may be pneumatic while each tire may have textured tread.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
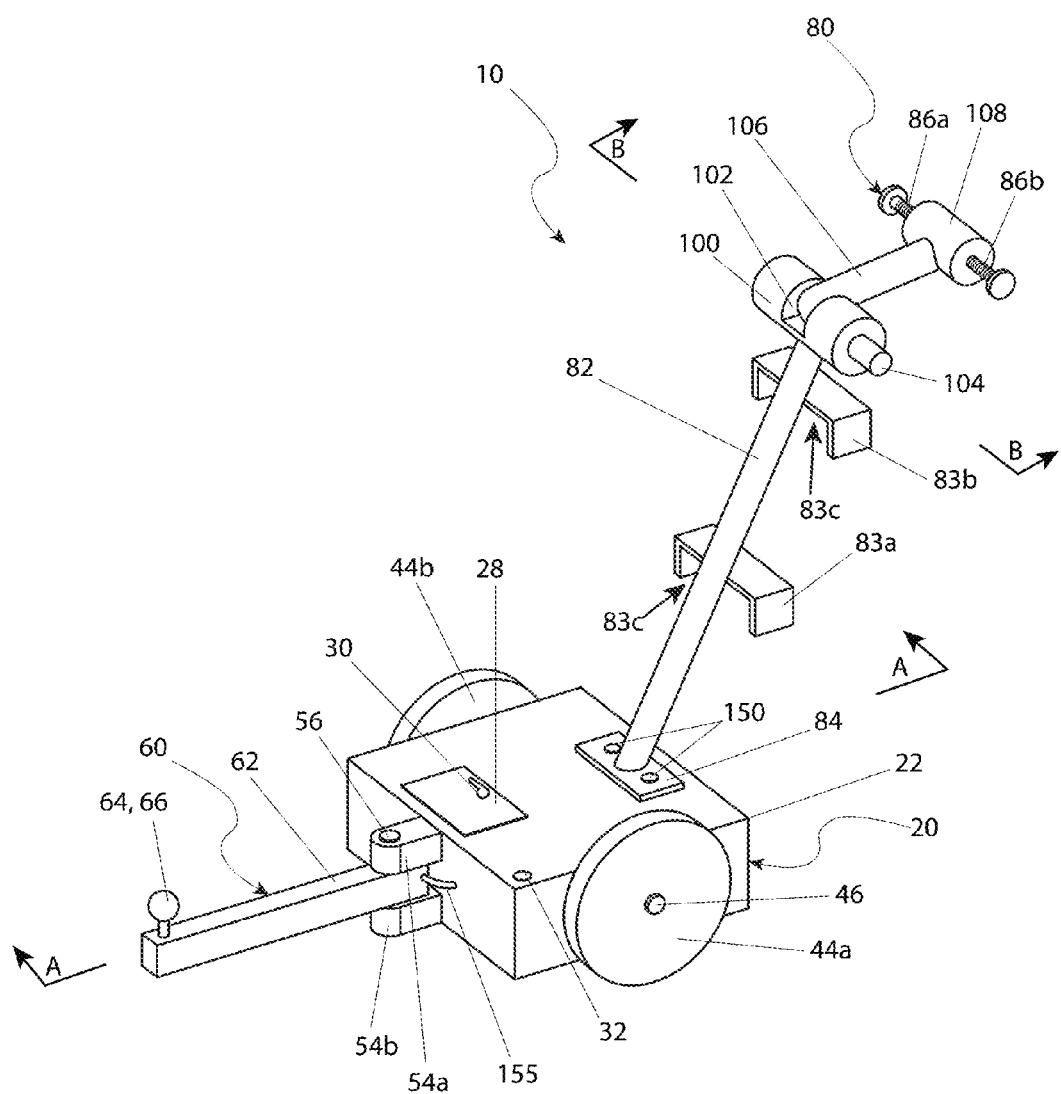
FIG. 1 is a perspective view of dumpster moving apparatus 10, according to a preferred embodiment of the present invention.

DESCRIPTIVE KEY 10 dumpster moving apparatus
20 motor enclosure
22 enclosure
23 interior space
24 battery compartment
26 battery
28 lid
30 latch
32 charging connector
40 control module
42 motor
44a first wheel assembly
44b second wheel assembly
45 tread
46 axle
47 first pulley
49 second pulley
52 drive belt
54a upper pivot plate
54b lower pivot plate
56 pivot pin
57 snap ring
60 tongue assembly
62 bar
64 hitch ball
66 electromagnet
80 handle assembly
82 lower post
83a first bracket
83b second bracket
83c bracket cavity
84 mounting plate
85 thumbscrew
86a first grip
86b second grip
87 hand stop
90 emergency stop switch
92 power switch
93 key
96 magnet switch
98 rheostatic switch
100 pivot mechanism
102 slot
103 tightening rod
104 tightening knob
105a first jam nut
105b second jam nut
106 upper post
108 control panel
110a third bracket
110b fourth bracket
150 fastener
155 wiring
160 ground surface
200 trash collecting vehicle

DETAILED DESCRIPTION OF THE PREFERRED EMBODIMENT

The best mode for carrying out the invention is presented in terms of its preferred embodiment, herein depicted within a preferred embodiment FIGS. 1 through 6. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope.

The terms "a" and "an" herein do not denote a limitation of quantity, but rather denote the presence of at least one (1) of the referenced items.

The present invention describes a dumpster moving apparatus (herein described as the "apparatus") 10, which provides a powered means to attach to and move a dumpster or other similar large wheeled container. The apparatus 10 provides a hand-truck-like function being specially equipped to couple to and manipulate a difficult to move garbage dumpster due to a limited space condition, uneven ground, or the like. The apparatus 10 allows a worker to easily move a dumpster or similar container to a location where it can be engaged and lifted for processing by a trash collection truck having a front mounted loading device.

Figure 2:
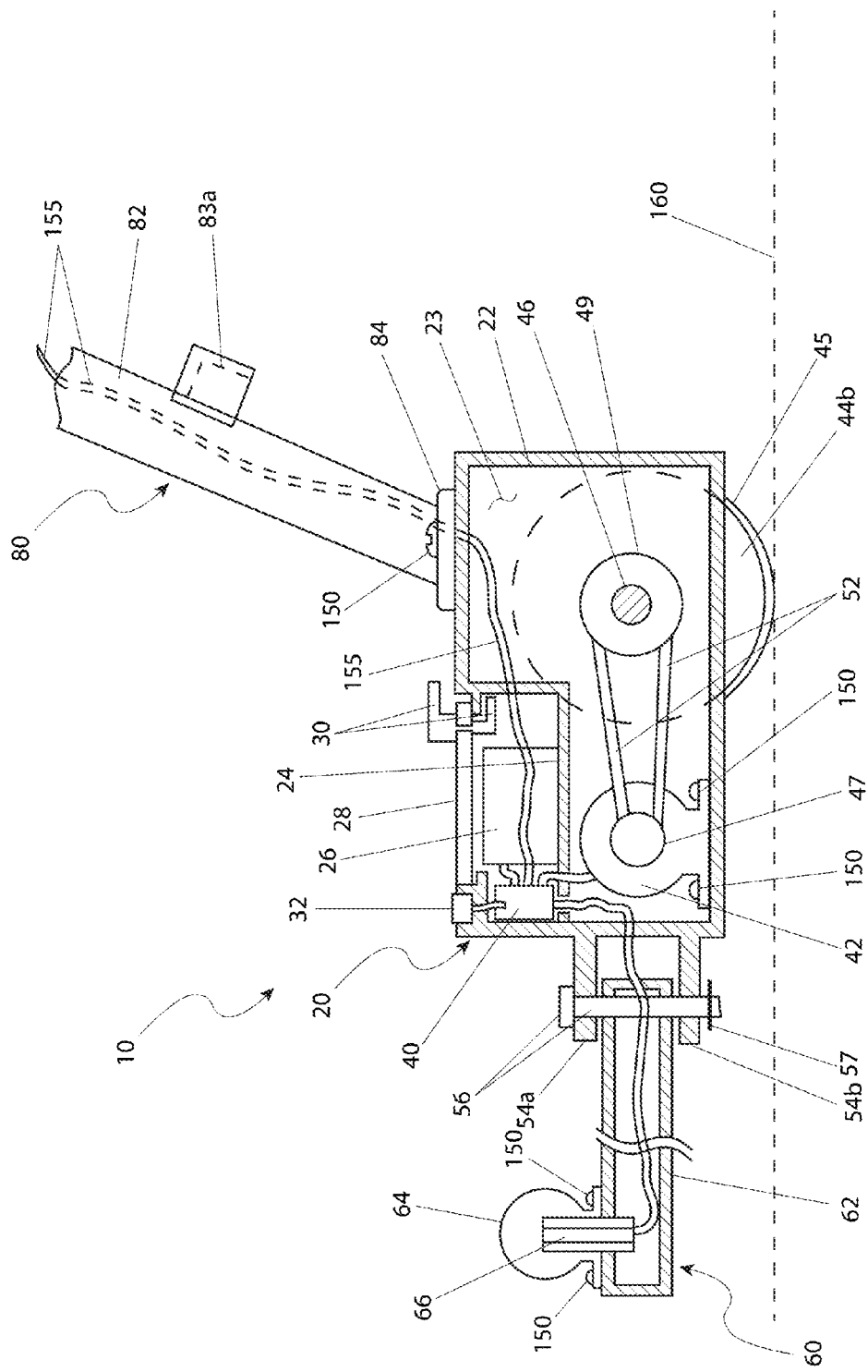
FIG. 2 is a sectional view of the dumpster moving apparatus 10 taken along section line A-A (see FIG. 1), according to a preferred embodiment of the present invention.

Referring now to FIGS. 1 and 2, perspective and sectional views of the apparatus 10, according to the preferred embodiment of the present invention, are disclosed. The apparatus 10 includes a motor enclosure 20, a tongue assembly 60, and a handle assembly 80.

The motor enclosure 20 provides a wheeled bi-directional means to motion an attached dumpster. The motor enclosure 20 includes a generally rectangular-shaped enclosure 22 which provides protective mounting and attachment of internal equipment necessary to attach to and manipulate an existing wheeled dumpster. The apparatus 10 is battery powered with the enclosure 22 providing an interior space 23 containing a battery compartment 24 with lid 28 and latch 30 portions. The enclosure 22 also provides an externally accessible battery charging connector 32, a control module 40, a bi-directional direct current (DC) motor 42, and two (2) pneumatic wheel assemblies 44a, 44b, mounted to end portions of an axle 46, along opposing side portions of the enclosure 22.

A user may motion the apparatus 10 in a motorized manner by rotating grip portions 86a, 86b located upon the handle assembly 80. The control module 40 receives electrical power from the battery 26 and outputs electrical current to portions of the apparatus 10 in response to electrically communicated signals from the handle assembly 80 (also see FIG. 3). A user motions the apparatus 10 forwardly or rearwardly in a controlled fashion by initiating rotation of the motor 42 and wheel assemblies 44a, 44b in a bi-directional and variable-speed manner. An embodiment of the apparatus 10 is shown here utilizing a first pulley 47 mounted to the motor 42, which in turn drives a second pulley 49 on the axle 46 via an interconnecting drive belt 52. A torsion from the motor 42 is communicated to the wheel assemblies 44a, 44b via the axle 46 which extends therebetween. As the axle 46 rotates, the wheel assemblies 44a, 44b rotate in a parallel manner forwardly or rearwardly. The tires of the wheel assemblies 44a, 44b are envisioned to be pneumatic units being approximately eight inches (8 in.) in diameter and having textured tread portions 45 along a perimeter surface to provide effective traction against a subjacent ground surface 160.

The motor enclosure 20 provides a means of attachment to the handle assembly 80 via a lower post portion 82 having an integral mounting plate portion 84 which is affixed to an upper proximal surface of the motor enclosure 20 using a plurality of fasteners 150. The lower post 82 is envisioned to be a tubular member which extends upwardly at a rearward angle from the motor enclosure 20, and terminates at a pivot mechanism 100.

The motor enclosure 20 also provides pivoting attachment of the tongue assembly 60 along a distal vertical surface via integral upper pivot plate 54a and lower pivot plate 54b portions which extend perpendicularly forward from the enclosure 22 in a parallel manner. The pivot plates 54a, 54b are spaced apart so as to receive and secure a bar portion 62 of the tongue assembly 60 in between, being axially secured to the pivot plates 54a, 54b using a pass-through pivot pin 56 and snap ring 57 arrangement. Electric wiring 155 from the control module 40 is routed from the enclosure 22 into a proximal end of the hollow bar portion 62 to a hitch ball portion 64 mounted upon a distal end portion of the bar 62 using fasteners 150. The hitch ball 64 is envisioned to be approximately two inches (2 in.) in diameter being sized to match that of a ball receiver portion of the dumpster. The wiring 155 provides electrical communication between the control module 40 and an electromagnet 66 located within the hitch ball portion 64. Upon energizing the electromagnet 66, the hitch ball 64 provides both a mechanical and magnetic means to secure the hitch ball 64 to the ball hitch receiver portion of the existing dumpster. In use, the hitch ball 64 is inserted into the receiver portion of the dumpster and the user then energizes the integral electromagnet 66 using a magnet switch 96 located upon the handle assembly 80 (see FIG. 4). The hitch ball 64 is then retained within in the receiver magnetically, allowing the user to manipulate the dumpster using the motorized portions 42 of the apparatus 10. The hitch ball 64 is then released from the dumpster as the user turns off the electromagnet 66 using the magnet switch 96 (see FIG. 4).

Figure 3:
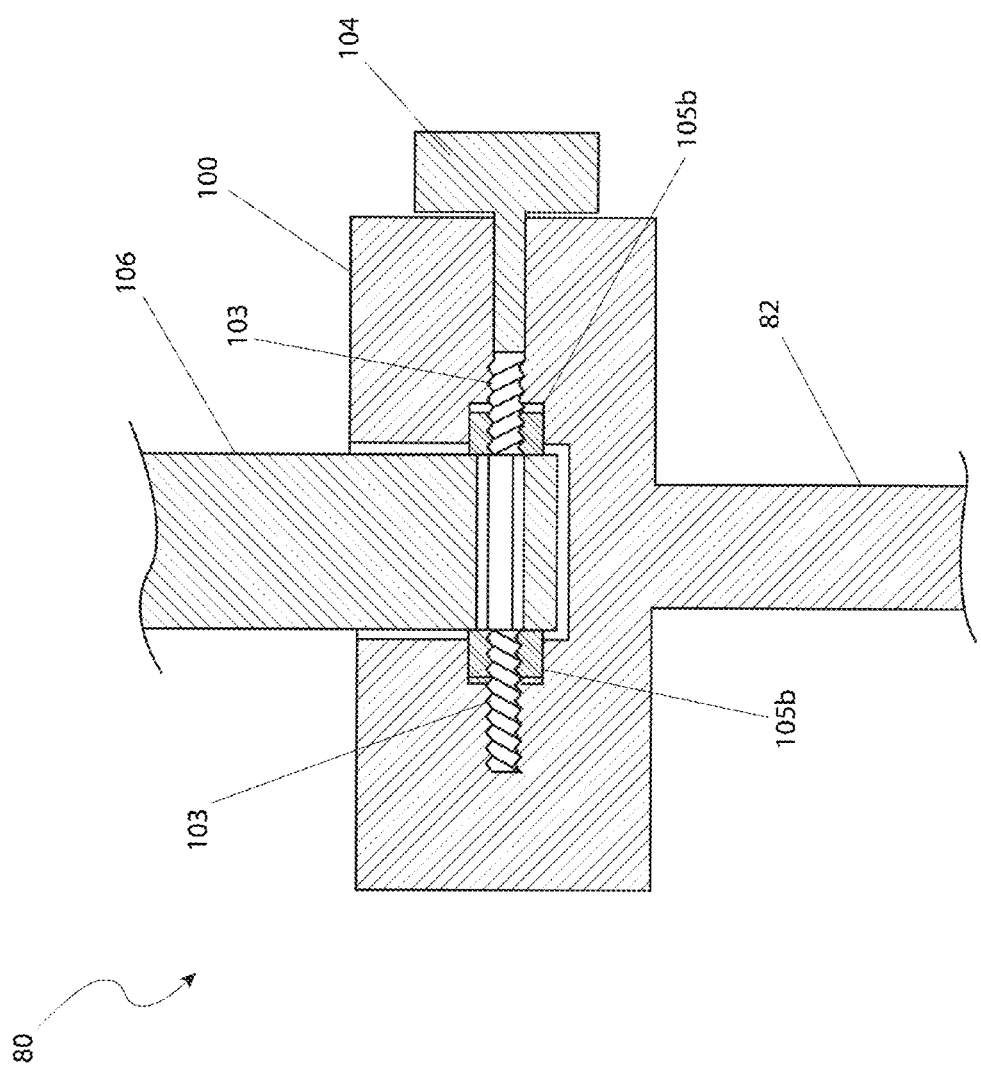
FIG. 3 is a sectional view of a pivot mechanism portion 100 of the dumpster moving apparatus 10 taken along section line B-B (see FIG. 1), according to a preferred embodiment of the present invention.

Referring now to FIG. 3, a sectional view of the pivoting mechanism portion 100 of the apparatus 10 taken along section line B-B (see FIG. 1), according to a preferred embodiment of the present invention, is disclosed. The pivot mechanism 100 provides rotating attachment of an upper post portion 106 of the handle assembly 80. The pivot mechanism 100 allows a user to position and secure the upper post 106 and integral portions including the grips 86a, 86b and a control panel 108, at various heights to provide comfortable gripping by different height users. The control panel 108 and grip portions 86a, 86b provide controls which allow for easy fingertip movement of the apparatus 10 and attached dumpster (also see FIG. 4).

The pivot mechanism 100 utilizes an external tightening knob portion 104 to cause clamping and securing of the upper post 106 at a desired position. The tightening knob 104 includes an integral tightening rod 103 which extends through center portions of both the pivot mechanism 100 and the upper post 106. The tightening rod 103 has first jam nut 105a and second jam nut 105b portions threaded thereupon and positioned along either side of the upper post 106. The tightening rod 103 passes through the first jam nut 105a and second jam nut 105b, being affixed thereto via respective left-hand and right-hand threaded portions, thereby causing the jam nuts 105a, 105b to be threadingly pulled together as the tightening rod 103 is rotated by the tightening knob 104. Referring now to FIG. 3, a close-up view of the handle assembly portion 80 of the apparatus 10, according to a preferred embodiment of the present invention, is disclosed. The handle assembly 80 provides conveniently positioned controls which allow a user to grasp and manipulate the apparatus 10 along a ground surface 160 using respective first grip 86a and second grip 86b portions. The grips 86a, 86b provide mechanically coupled cylindrical appendages arranged along a common axis, capable of being rotated by either or both of the user's hands. The grips 86a, 86b further include a rheostatic switch 98 being in electrical communication with the control module 40 to provide a means to motion the apparatus 10 forwardly or rearwardly in a bi-directional and variable-speed manner. Furthermore, each grip 86a, 86b is envisioned to include a knurled or rubberized surface and a circular perpendicularly extending hand stop feature 87 for a more secure grasping thereof.

Figure 4:
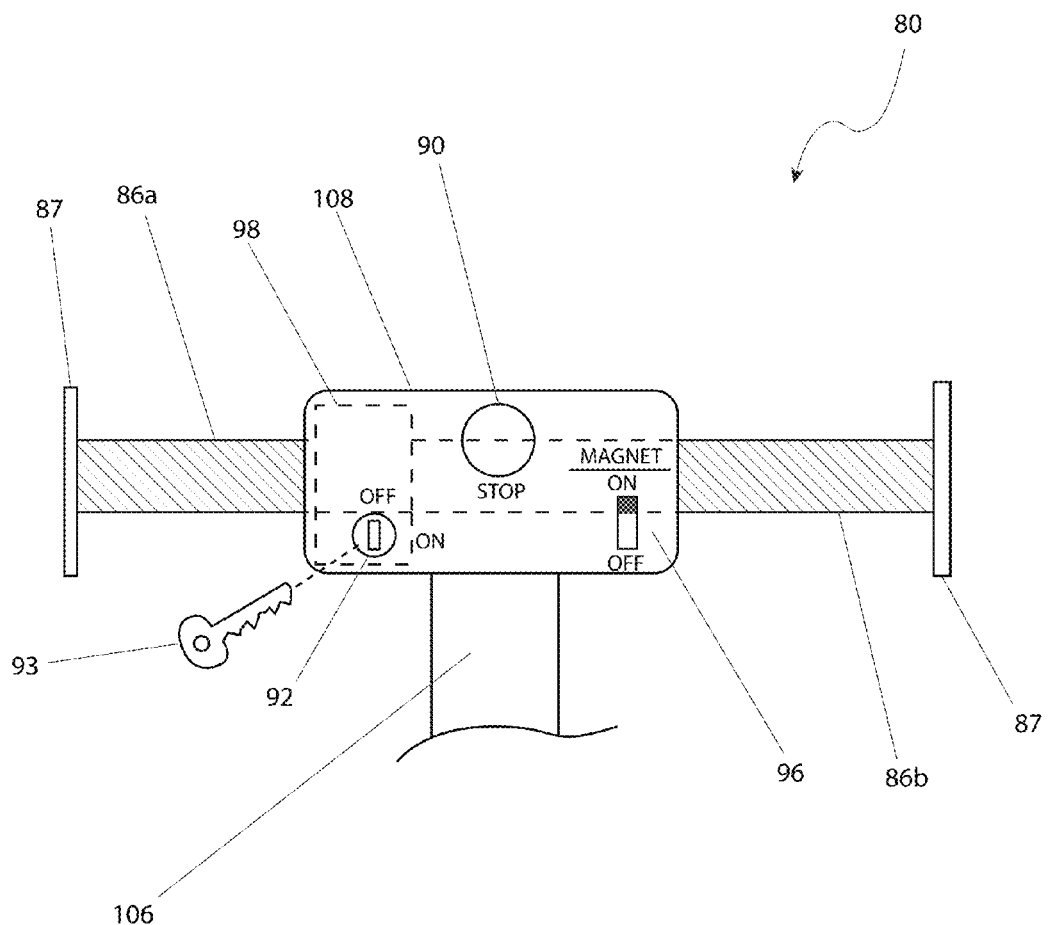
FIG. 4 is a close-up view of a handle assembly portion 80 of the dumpster moving apparatus 10, according to a preferred embodiment of the present invention.

Referring now to FIG. 4, a close-up view of the handle assembly portion 80 of the apparatus 10, according to a preferred embodiment of the present invention, is disclosed. The handle assembly 80 provides conveniently positioned controls which allow a user to grasp and manipulate the apparatus 10 along a ground surface 160 using respective first grip 86a and second grip 86b portions. The grips 86a, 86b provide mechanically coupled cylindrical appendages arranged along a common axis, capable of being rotated by either or both of the user's hands. The grips 86a, 86b provide a rotary device suitable for grasping and rotating by a user using one (1) or both hands, causing activation of an internal rheostatic switch 98 being in electrical communication with the control module 40 to provide a means to motion the apparatus 10 forwardly or rearwardly in a bi-directional and variable-speed manner. Furthermore, each grip 86a, 86b is envisioned to include a knurled or rubberized surface and a circular perpendicularly extending hand stop feature 87 for a more secure grasping thereof. An embodiment of the control panel 108 is illustrated here including, but not limited to: an emergency stop button 90, an on/off power switch 92 which requires insertion and operation using a key 93, and a two-position magnet switch 96 which provides selective activation of the electromagnet 66 located within the hitch ball 64 (see FIG. 2).

Figure 5:
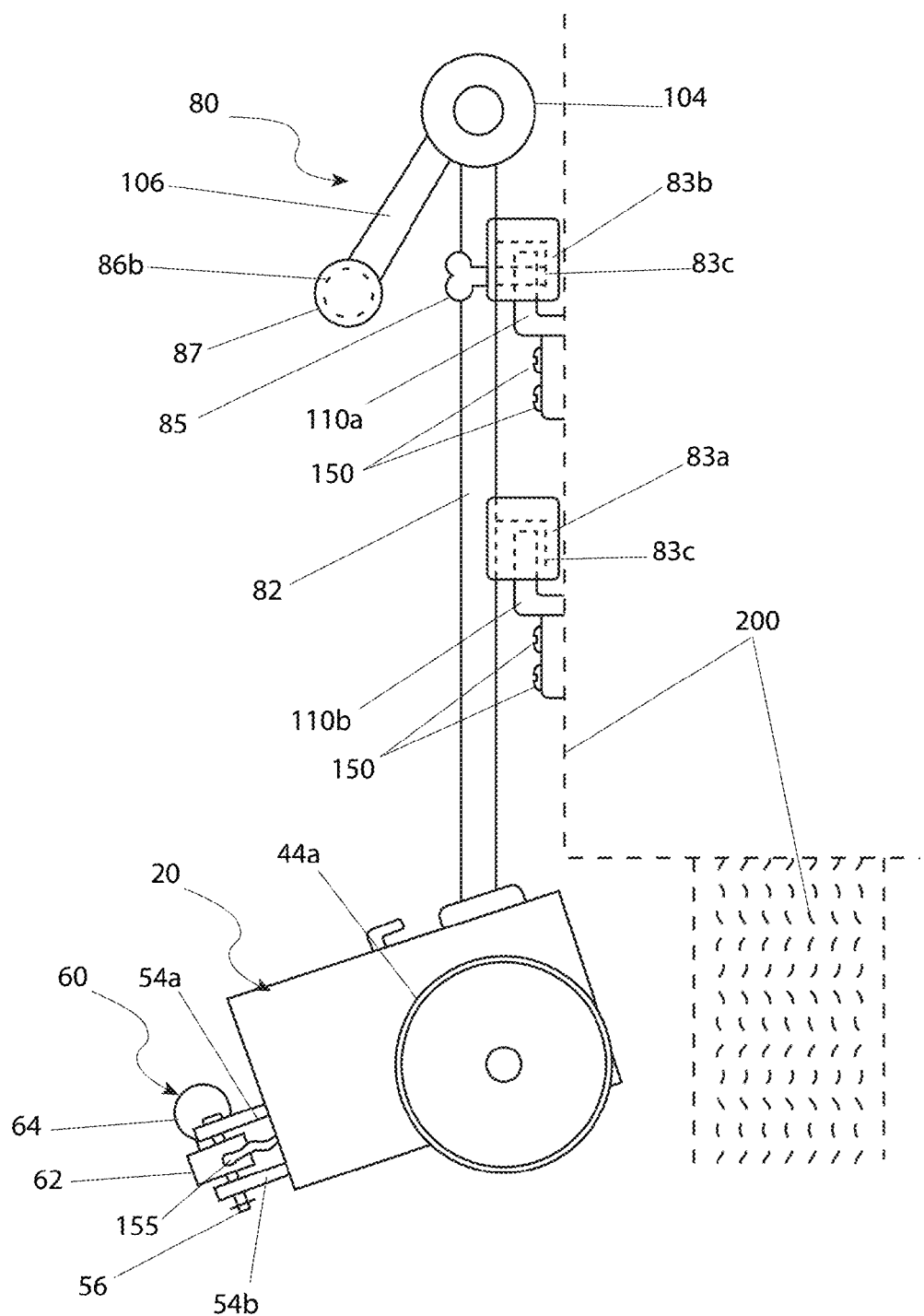
FIG. 5 is an environmental view of the dumpster moving apparatus 10 depicting a stowed state upon a vehicle 200, according to a preferred embodiment of the present invention; and, FIG. 6 is an electrical block diagram of the dumpster moving apparatus 10, according to a preferred embodiment of the present invention.

Referring now to FIG. 5, an environmental view of the apparatus 10 depicting a stowed state upon a vehicle 200, according to a preferred embodiment of the present invention, is disclosed. The pivoting nature of the upper post 106 and the tongue assembly 60 portions enable the apparatus 10 to be configured for compact storage upon the vehicle 200 when not in use as shown here.

The lower post portion 62 of the handle assembly 80 includes integral first bracket 83a and a second bracket 83b portions. The brackets 83a, 83b are arranged in a parallel manner with respect to each other, and perpendicular to a rearward-facing surface of the lower post 62. Each bracket 83a, 83b is envisioned being made using a length of channel-shaped stock with closed end portions so as to form a downward-facing bracket cavity 83c. The cavities 83c are in turn inserted upon correspondingly shaped and positioned upwardly protruding third bracket 110a, and fourth bracket 110b portions having a "Z"-shape and being affixed to a side surface of the existing trash collection vehicle 200 using a plurality of fasteners 150. It is envisioned that at least one (1) thumbscrew 85, or equivalent securement method, may be utilized to further secure one (1) or both first 83a and second 83b brackets to the third 110a and/or fourth 110b brackets, to obtain a more robust attachment of the apparatus 10 to the trash collection vehicle 200, as needed.

Figure 6:
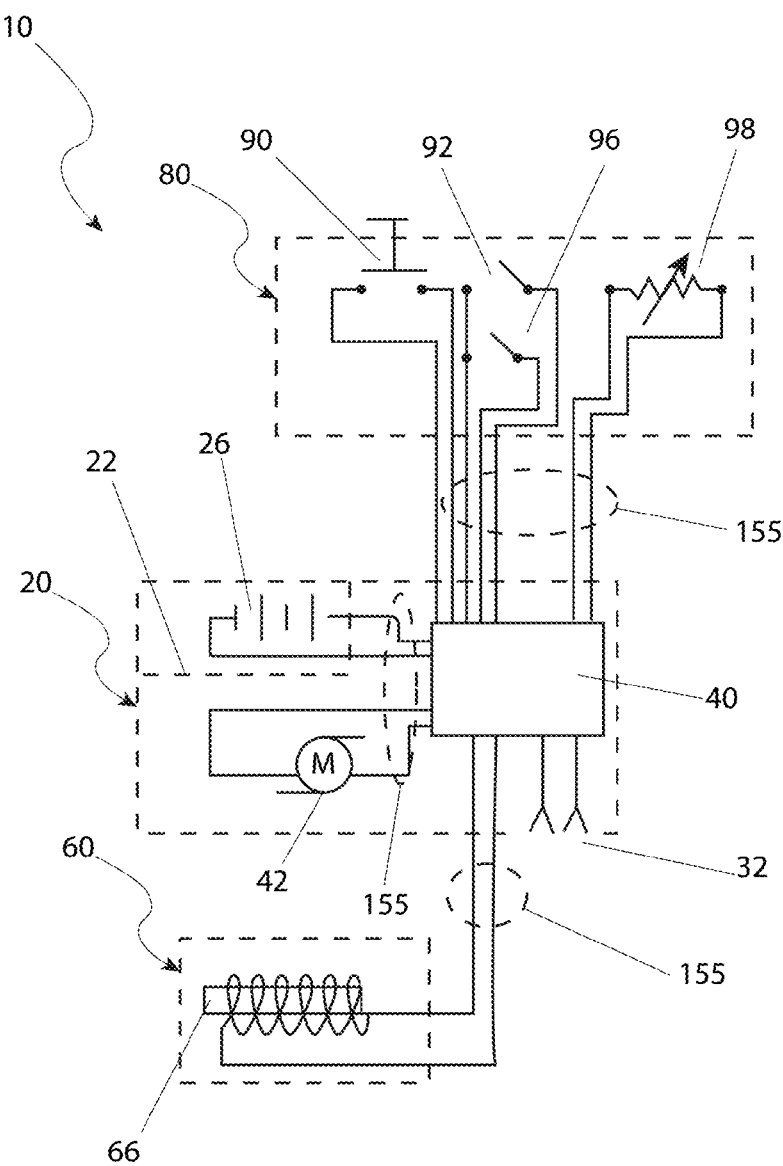

Referring now to FIG. 6, an electrical block diagram of the apparatus 10, according to a preferred embodiment of the present invention, is disclosed. The electrical and electronic functions of the apparatus 10 are controlled via a microprocessor-based control module 40 including components such as, but not limited to: printed circuit boards, microprocessor chip sets, embedded software, relays, and the like. The control module 40 is to be capable of processing input signals conducted using common wiring 155 from the power switch 92, the magnet switch 96, and the rheostatic switch 98. The control module 40 further provides an output current in accordance with software instructions to the motor 42 and the electromagnet 66 portions of the apparatus 10. The control module 40 is to include motor control circuitry capable of powering and controlling the bi-directional DC motor 42 in a variable speed manner. The control module 40 receives electrical power from the battery 26, as well as provides control of the battery charging process. Charging of the battery 26 is envisioned to take place during times when the apparatus 10 is not being used via connection of a charging source to the charging connector 32 such as the electrical system of the trash collection vehicle 200, a 110-volt outlet, or the like.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the apparatus 10, it would be configured and utilized as indicated in FIG. 1 and FIG. 3.

The method of preparing the apparatus 10 for use may be achieved by performing the following steps: procuring the apparatus 10; charging the battery 26 via connection of the charging connector 32 to a power source such as the electrical system of the trash collection vehicle 200 or a 110-volt outlet for a period of time; installing the apparatus 10 upon the trash collecting vehicle 200 by engaging the bracket cavity portions 83c of the lower post 82 onto the corresponding third 110a and fourth 110b brackets; and, securing the apparatus 10 to the vehicle 200 using the thumbscrew 85 or similar securement means. The apparatus 10 is now ready for use.

The method of utilizing the apparatus 10 may be achieved by performing the following steps: operating the trash collecting vehicle 200 in a normal manner; arriving at a destination which requires manipulation of a dumpster in order to be accessed by dumpster processing equipment portions of the existing trash collecting vehicle 200; removing the thumbscrew 85 from the brackets 83b, 110a; lifting and removing the apparatus 10 from the vehicle 200; placing the apparatus 10 upon the ground surface 160; adjusting a position of the upper post 106 and control panel 108 portions by loosening the tightening knob 104; rotating the upper post 106 until obtaining a desired position of the control panel 108; rotating and tightening the tightening knob 104; activating the apparatus 10 by inserting and turning the key 93 within the on/off switch 92; manipulating the apparatus 10 forwardly or rearwardly upon the wheel assemblies 44a, 44b along the ground surface 160 by rotating the grips 86a, 86b using either or both of the user's hands; directing the apparatus 10 by motioning the handle assembly 80 from side to side, as needed; positioning the hitch ball portion 64 of the tongue assembly 60 directly below a receiver portion of a dumpster; tilting the apparatus 10 backward using the handle assembly 80 until the hitch ball 64 engages the receiver portion of a dumpster; activating the internal electromagnet 66 to secure the hitch ball 64 within the receiver using the magnet switch 96 located upon the handle assembly 80; utilizing the grips 86a, 86b and the pivoting tongue assembly 60 to move the dumpster into a location which is accessible to front load portions of the vehicle 200 to perform normal processing; releasing the hitch ball 64 from the dumpster by turning off the electromagnet 66 using the magnet switch 96; motioning the apparatus 10 to a position adjacent to the trash collecting vehicle 200 using the grips 86a, 86b; and, replacing the apparatus 10 upon the third 110a and fourth 110b brackets as previously described.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A moving apparatus, comprising:
   a motor enclosure comprising:
   an interior space defined by said motor enclosure, comprising:
      a power source secured therewithin;
      a control module secured therewithin and in electrical communication with said power source;
      a motor secured therewithin and in electrical communication with said power source and said control module;
      a first pulley mounted to said motor;
      a drive belt driven by said first pulley;
      a second pulley driven by said drive belt; and, a pair of wheel assemblies secured on opposite outer sides of said enclosure by an axle passing through said enclosure, said axle driven by said motor;

a tongue assembly mounted to a front side of said motor enclosure and projecting perpendicularly to said axle; and, a handle assembly secured to a top surface of said motor enclosure, comprising a control panel in electrical communication with said control module;

wherein said second pulley is located on said axle;

wherein torsion generated by said motor is mechanically communicated to said first pulley, said drive belt, said second pulley, and said axle thereby turning said pair of wheel assemblies;

wherein said tongue assembly is configured to be in mechanical communication with a receiver portion of a dumpster; and, wherein said apparatus is capable of being manipulated by a user via interface with said control panel, selectively controlling, said motor.

2. The apparatus of claim 1, wherein said tongue assembly further comprises:

a bar; and, a hitch ball, comprising an electromagnet secured within an interior space thereof and projecting through an aperture in a top surface distal end of said bar;

wherein said electromagnet is in electrical communication with said control module; and, wherein said electromagnet is selectively magnetized upon activation of said apparatus by said control panel.

3. The apparatus of claim 2, wherein said motor enclosure further comprises:

an upper pivot plate having an upper aperture secured to said front side of said motor enclosure and projecting perpendicularly to said axle;

a lower pivot plate having a lower aperture secured to said front side of said motor enclosure, beneath said upper pivot plate and projecting perpendicularly to said axle; and, a pivot pin;

wherein said bar of said tongue assembly has a pivot pin aperture at a distal end and is secured between said upper and lower pivot plates by said pivot pin being fixedly placed through aligned upper, bar and lower pin apertures and with a snap ring.

4. The apparatus of claim 2, wherein said handle assembly further comprises:

a lower post;

an upper post pivotally connected to said lower post;

a first grip extending away from a first side of said control panel;

a second grip extending away from a second side of said control panel; and, said control panel affixed to an upper end of said upper post, further comprising:

a rheostatic switch operably connected to said first and second grip and in electrical communication between said control module, said power source and said motor;

an emergency stop button in electrical communication between said control module, said power source and said motor;

a power switch in electrical communication between said control module, said power source and said motor; and, a two-position magnet switch providing selective activation of said electromagnet, and in electrical communication between said power source and said motor;

wherein rotation of each grip in a forward direction corresponds to a forward direction of rotation of said pair of wheel assemblies; and, wherein rotation of each grip in a reverse direction corresponds to a reverse direction of rotation of said pair of wheel assemblies.

5. The apparatus of claim 1, wherein said power source is a rechargeable battery secured within a battery compartment within said motor enclosure;

wherein said battery compartment further has a lid located within said top surface of said motor enclosure further having a latching mechanism; and, wherein a battery charging connector is located within said top surface of said motor enclosure and in electrical communication with said battery when said battery charging connector is in electrical communication with an external power source.

6. The apparatus of claim 4, wherein said handle assembly further comprises:

a first bracket located on said lower post; and, a second bracket located on said lower post secured beneath said first bracket;

wherein said first and said second brackets are each capable of attachment to a towing vehicle.

7. The apparatus of claim 6, wherein said first bracket is positionally capable of removably interlocking with a third bracket adapted to be affixed to said towing vehicle; and, wherein said second bracket is positionally capable of removably interlocking with a fourth bracket adapted to be affixed to said towing vehicle.

8. The apparatus of claim 1, wherein each said wheel assembly is pneumatic.

9. The apparatus of claim 8, wherein tires of each said wheel assembly comprise textured tread.

10. A moving apparatus, comprising:

a motor enclosure comprising:

an interior space defined by said motor enclosure, comprising:

a power source secured therewithin;

a control module secured therewithin and in electrical communication with said power source;

a motor secured therewithin and in electrical communication with said power source and said control module;

a first pulley mounted to said motor;

a drive belt driven by said first pulley; and, a second pulley driven by said drive belt; and, a pair of wheel assemblies secured on opposite outer sides of said enclosure by an axle passing through said enclosure, said axle driven by said motor;

a tongue assembly removably mounted to a front side of said motor enclosure and projecting perpendicularly to said axle; and, a handle assembly secured to a top surface of said motor enclosure, comprising a control panel in electrical communication with said control module;

wherein said second pulley is located on said axle;

wherein torsion generated by said motor is mechanically communicated to said first pulley, said drive belt, said second pulley, and said axle thereby turning said pair of wheel assemblies;

wherein said tongue assembly is configured to be in mechanical communication with a receiver portion of a dumpster; and, wherein said apparatus is capable of being manipulated by a user via interface with said control panel, selectively controlling, said motor.

11. The apparatus of claim 10, wherein said tongue assembly further comprises:
a bar; and,
a hitch ball, comprising an electromagnet secured within an interior space thereof and projecting through an aperture in a top surface distal end of said bar;
wherein said electromagnet is in electrical communication with said control module; and,
wherein said electromagnet is selectively magnetized upon activation of said apparatus by said control panel.

12. The apparatus of claim 11, wherein said motor enclosure further comprises:
an upper pivot plate having an upper aperture secured to said front side of said motor enclosure and projecting perpendicularly to said axle;
a lower pivot plate having a lower aperture secured to said front side of said motor enclosure, beneath said upper pivot plate and projecting perpendicularly to said axle; and,
a pivot pin;
wherein said bar of said tongue assembly has a pivot pin aperture at a distal end and is secured between said upper and lower pivot plates by said pivot pin being fixedly placed through aligned upper, bar and lower pin apertures and with a snap ring.

13. The apparatus of claim 11, wherein said handle assembly further comprises:
a lower post;
an upper post pivotally connected to said lower post;
a first grip extending away from a first side of said control panel;
a second grip extending away from a second side of said control panel; and,
said control panel affixed to an upper end of said upper post, further comprising:
a rheostatic switch operably connected to said first and second grip and in electrical communication between said control module, said power source and said motor;
an emergency stop button in electrical communication between said control module, said power source and said motor;
a power switch in electrical communication between said control module, said power source and said motor; and,
a two-position magnet switch providing selective activation of said electromagnet, and in electrical communication between said power source and said motor;
wherein rotation of each grip in a forward direction corresponds to a forward direction of rotation of said pair of wheel assemblies; and,
wherein rotation of each grip in a reverse direction corresponds to a reverse direction of rotation of said pair of wheel assemblies.

14. The apparatus of claim 10, wherein said power source is a rechargeable battery secured within a battery compartment within said motor enclosure;
wherein said battery compartment further has a lid located within said top surface of said motor enclosure further having a latching mechanism; and,
wherein a battery charging connector is located within said top surface of said motor enclosure and in electrical communication with said battery when said battery charging connector is in electrical communication with an external power source.

15. The apparatus of claim 13, wherein said handle assembly further comprises:
a first bracket located on said lower post; and,
a second bracket located on said lower post secured beneath said first bracket;
wherein said first and said second brackets are each capable of attachment to a towing vehicle.

16. The apparatus of claim 15, wherein said first bracket is positionally capable of removably interlocking with a third bracket adapted to be affixed to said towing vehicle; and,
wherein said second bracket is positionally capable of removably interlocking with a fourth bracket adapted to be affixed to said towing vehicle.

17. The apparatus of claim 10, wherein each said wheel assembly is pneumatic.

18. The apparatus of claim 17, wherein tires of each said wheel assembly comprise textured tread.

* * * * *